United States Patent

Pisoni

(10) Patent No.: US 8,102,924 B2
(45) Date of Patent: Jan. 24, 2012

(54) ARRANGEMENTS AND METHODS FOR PER TONE EQUALIZATION WITH REDUCED COMPLEXITY

(75) Inventor: Fabio Pisoni, Busto Garolfo (BE)

(73) Assignee: STMicroelectronics N.V., Amsterdam (NL)

( * ) Notice: Subject to any disclaimer, the term of this patent is extended or adjusted under 35 U.S.C. 154(b) by 943 days.

(21) Appl. No.: 11/014,671

(22) Filed: Dec. 16, 2004

(65) Prior Publication Data

US 2005/0135496 A1    Jun. 23, 2005

(30) Foreign Application Priority Data

Dec. 19, 2003    (EP) .................................... 03079137

(51) Int. Cl.
*H04K 1/10*    (2006.01)
(52) U.S. Cl. ........ 375/260; 375/229; 375/267; 375/271; 375/295; 375/316; 370/352; 370/465
(58) Field of Classification Search .......... 375/135–136, 375/144, 146–148, 152, 222, 229, 232, 235, 375/260, 267, 346, 349–350, 219, 316, 259, 375/295, 306, 16

See application file for complete search history.

(56) References Cited

U.S. PATENT DOCUMENTS

| | | | |
|---|---|---|---|
| 4,972,357 A | | 11/1990 | Morel |
| 6,434,233 B1 * | | 8/2002 | Bjarnason et al. ........ 379/406.01 |
| 6,459,678 B1 * | | 10/2002 | Herzberg ...................... 370/203 |
| 7,006,564 B2 * | | 2/2006 | Ling et al. ..................... 375/232 |
| 7,076,010 B1 * | | 7/2006 | Heidari et al. ................ 375/346 |
| 7,136,411 B2 * | | 11/2006 | Strauessnigg ................. 375/219 |
| 7,200,138 B2 * | | 4/2007 | Liu ................................ 370/352 |
| 2003/0063680 A1 * | | 4/2003 | Nedic et al. ................... 375/260 |

(Continued)

FOREIGN PATENT DOCUMENTS

| | | |
|---|---|---|
| EP | 0 967 763 A1 | 12/1999 |
| EP | 0 969 637 A1 | 1/2000 |

OTHER PUBLICATIONS

Van Acker, K., et al., *Per Tone Equalization for DMT-Based Systems*, IEEE Transactions on Communications, vol. 49, No. 1, Jan. 2001, pp. 109-119.

(Continued)

*Primary Examiner* — Shuwang Liu
*Assistant Examiner* — Hirdepal Singh
(74) *Attorney, Agent, or Firm* — Lisa K. Jorgenson; James H. Morris; Wolf, Greenfield & Sacks, P.C.

(57) ABSTRACT

An equalizer for a multi carrier signal for carrying out equalization adapted to each carrier or group of carriers, Fourier transforms the multi carrier signal, and obtains difference terms of the multi carrier signal. Both are input to an adaptive filter, to output equalized signals, wherein decimation is applied to at least some of the difference terms input to the filter. This enables the complexity to be reduced for a given performance level. In particular since only non-zero filter taps need to be stored and updated, coefficient memory and coefficient calculation capacity can be reduced. Another way to reduce complexity involves measuring noise for at least some of the carriers, and dynamically adapting the size of the filter on a per carrier basis according to global optimizion heuristic algorithms which adapt this filter size based on the comparison between this noise and an optimal performance figure achieved in a previous ISI-ICI free measurement phase.

25 Claims, 5 Drawing Sheets

U.S. PATENT DOCUMENTS

| | | | |
|---|---|---|---|
| 2003/0076900 A1* | 4/2003 | Magee et al. | 375/316 |
| 2003/0128752 A1* | 7/2003 | Harikumar et al. | 375/232 |
| 2003/0225807 A1* | 12/2003 | Efland | 708/404 |
| 2004/0003185 A1* | 1/2004 | Efland et al. | 711/150 |
| 2004/0042543 A1* | 3/2004 | Li et al. | 375/222 |
| 2006/0203843 A1* | 9/2006 | Liu | 370/465 |
| 2007/0263741 A1* | 11/2007 | Erving et al. | 375/260 |

OTHER PUBLICATIONS

Van Acker K. et al.: "Frequency Domain Equalization With Tone Grouping In DMT/ADSL-Receivers" Signals, Systems, And Computers, 1999. Conference Record of the Thirty-Third Asilomar Conference on Oct. 24-27, 1999, Piscataway, NJ, USA, IEEE, US Oct. 24, 1999, pp. 1067-1070, XP010373800 ISBN: 0-7803-5700-0.

* cited by examiner

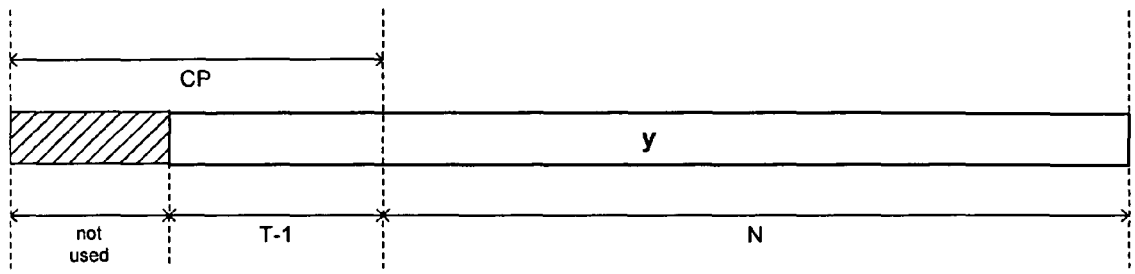
Figure 3 PRIOR ART VECTOR Y AS PART OF RECEIVED DMT SYMBOL
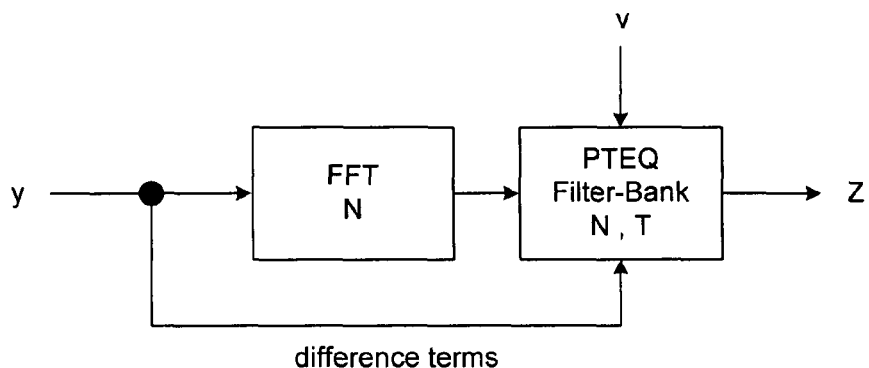
Figure 4 - PRIOR ART PTEQ filter bank
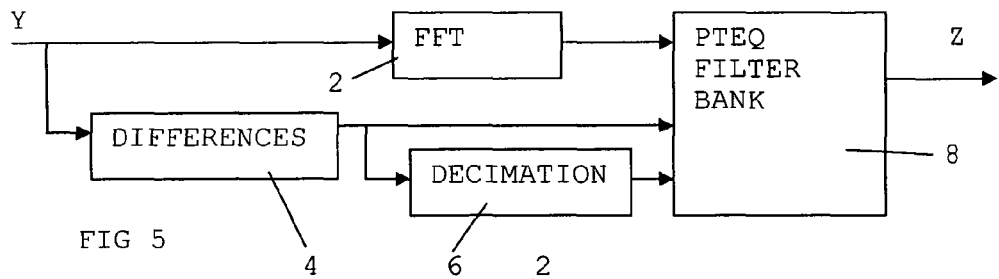
FIG 5
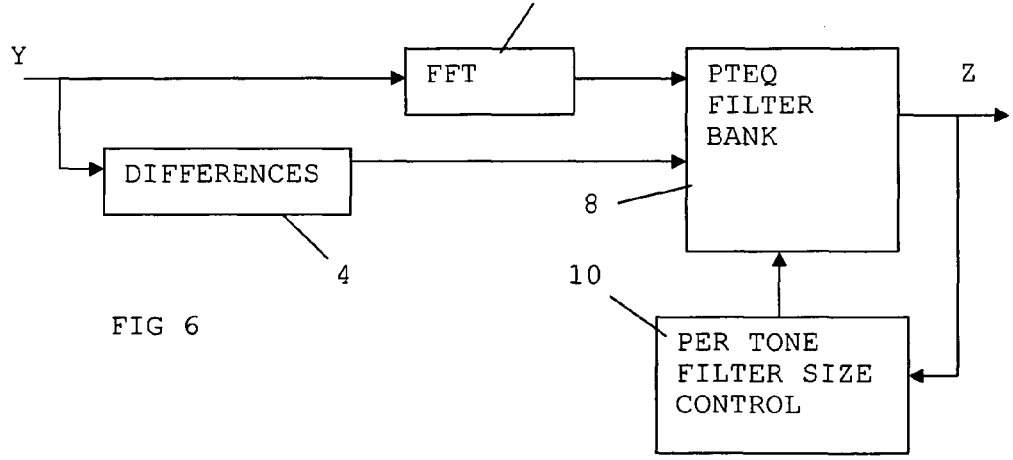
FIG 6

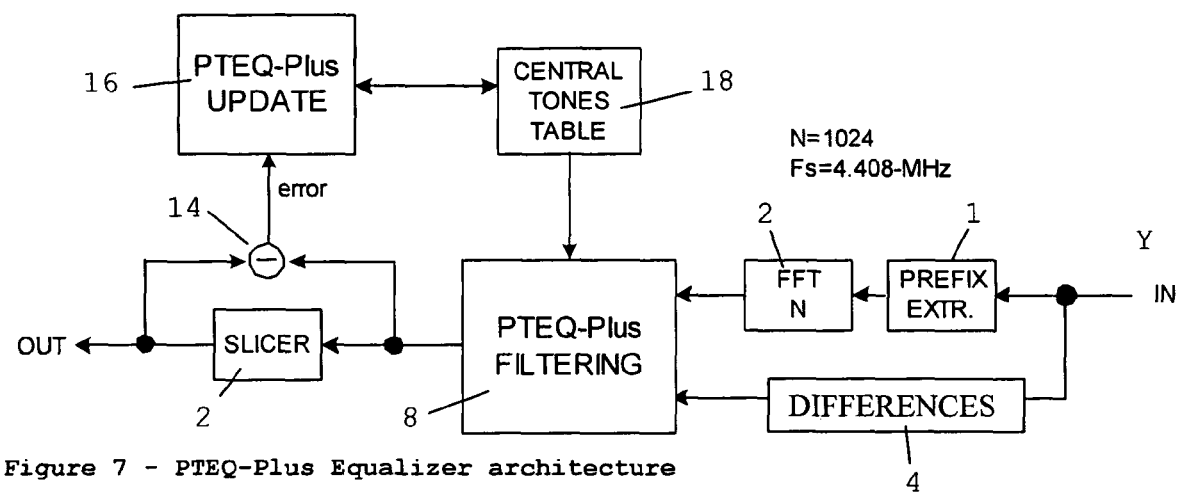
Figure 7 - PTEQ-Plus Equalizer architecture

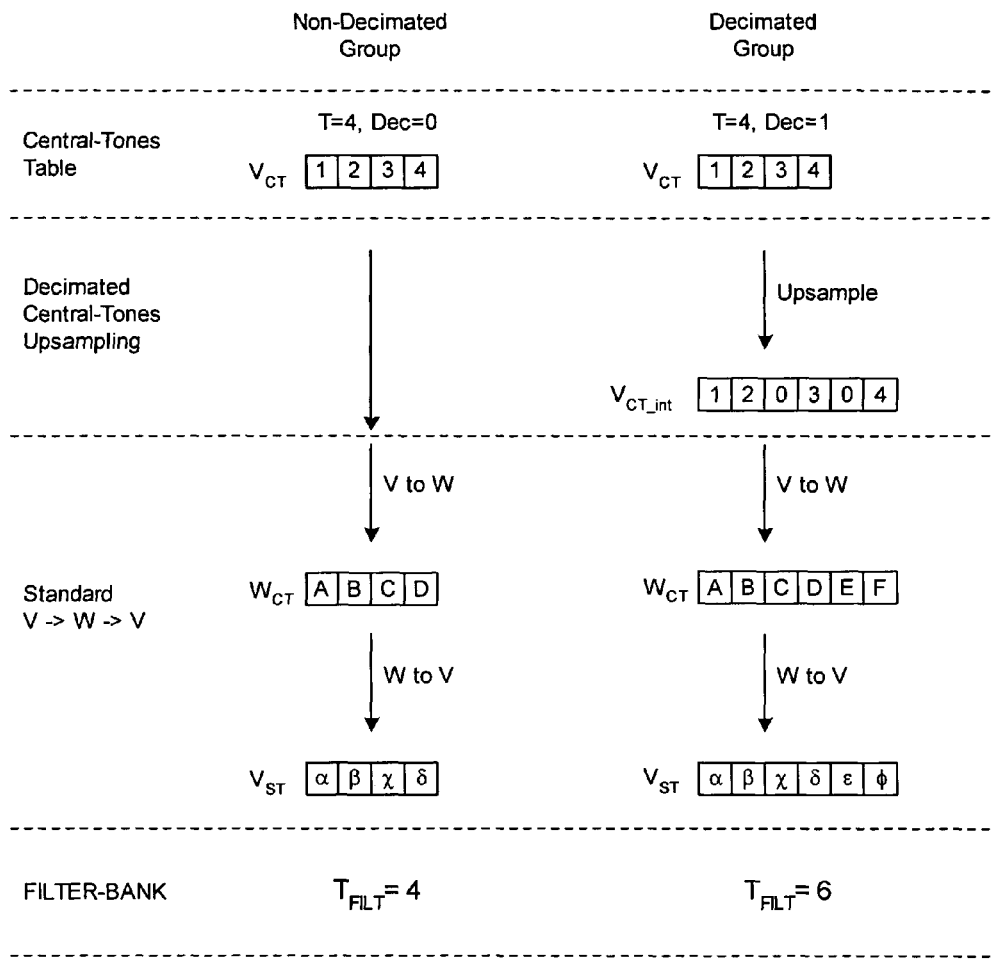
Figure 8 - v->w->v for standard and decimated groups
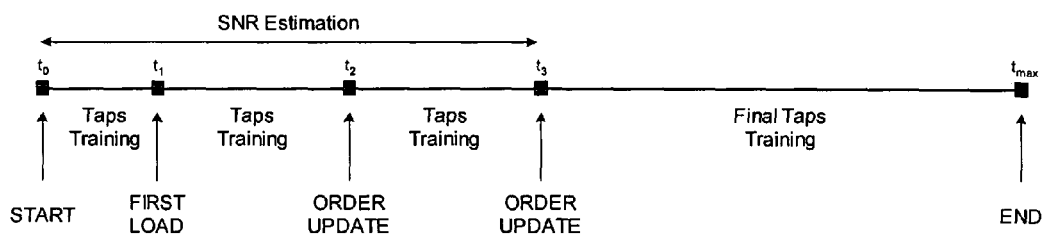
Figure 9 - the complete PTEQ-Plus update

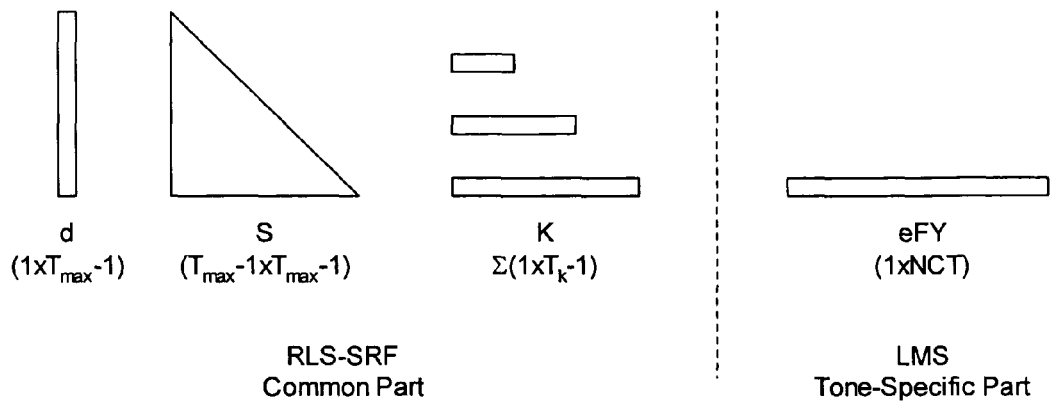
Figure 10 – taps training, RLS and LMS data-structure
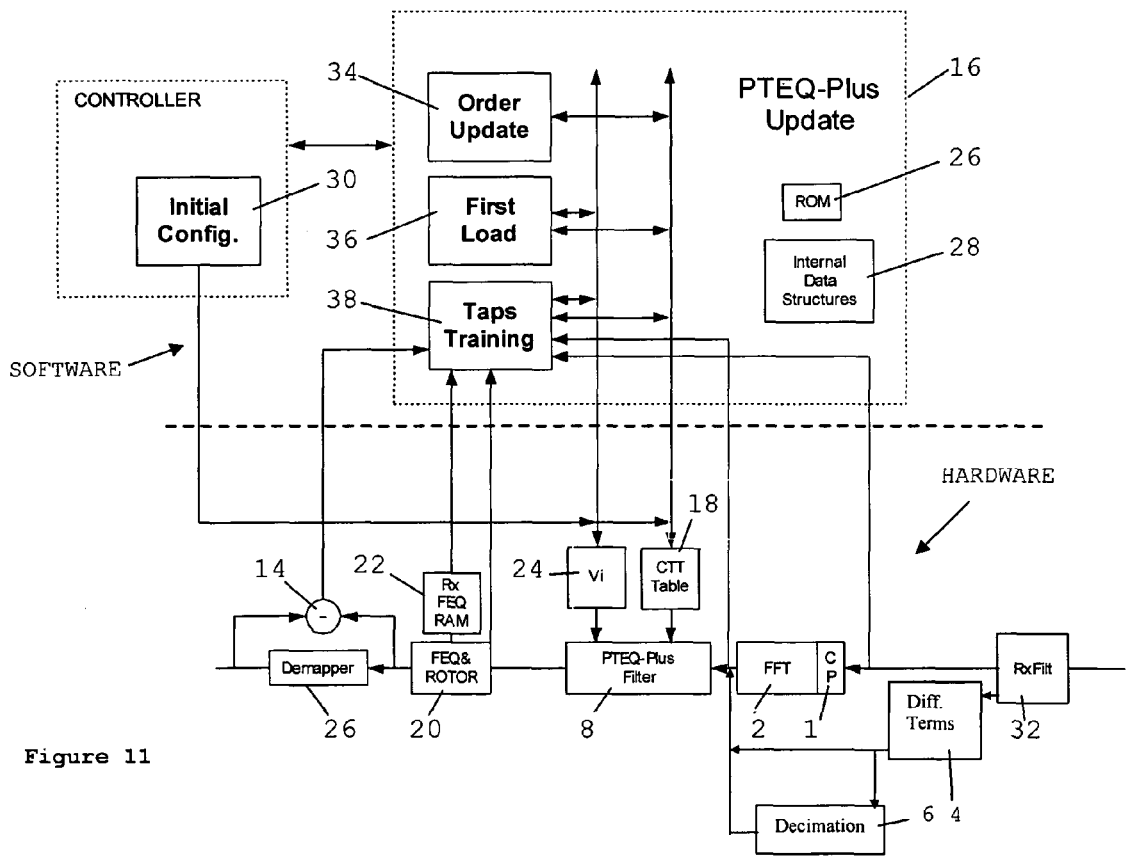
Figure 11

ARRANGEMENTS AND METHODS FOR PER TONE EQUALIZATION WITH REDUCED COMPLEXITY

BACKGROUND OF THE INVENTION

1. Field of the Invention

This invention relates to equalizers for multi carrier signals, to equipment having such equalizers, e.g. modems, corresponding methods of equalizing and methods of offering a communication service over a link having such equalizers, and to equalized signals.

2. Description of the Related Art

Multi-carrier modulation is a well known means of transmitting digital data by splitting that data into fixed-length data "blocks" or "symbols" each having the same number of sub-blocks or bits. Analog transmission of these blocks is carried out using a set of carrier signals. For example, there can be a carrier for each of the sub-blocks in one block. The carriers have frequencies which are equally spaced across the transmission band of the transceiver. The carrier frequencies can be orthogonal or not. One such arrangement is called DMT (Discrete multi-tone). DMT modems transmit data by dividing it into several interleaved bit streams, and using these bit streams to modulate several carriers. DMT is used for examples in DSL (Digital subscriber Line) which enables high speed digital data transport over telephone lines. Some varieties of DSL such as ADSL (Asymmetric Digital Subscriber Line), overlay the carriers on the analogue POTS (Plain Old Telephone Service) service. ADSL is useful so that telephone companies can reuse most of their installed wiring for the introduction of new services. By using DMT (Discrete Multi Tone) modulation, carriers with a higher signal to noise ratio (SNR) are capable of carrying more bits than carriers with a low SNR, enabling higher transmission rates.

A significant limitation in this and any multiple carrier system is intersymbol and inter-carrier interference (ISI-ICI). This is essentially caused by delays in the transmission path which can vary with frequency. Since a typical signal pulse can be regarded as having components at many frequencies, the effect is to spread or "disperse" the pulse in the time domain, and this spreading can cause overlap with neighboring pulses. The average duration of the delays is not the principal issue here, it is the variation or range of the delays, varying with time and frequency for example, which causes the "dispersion" and hence ISI.

A known countermeasure to intersymbol and intercarrier interference due to transmission of the DMT symbols over a channel between multicarrier transmitter and multicarrier receiver involves adding a cyclic extension (CE, also called cyclic prefix, CP) to each DMT symbol. The data rate, however, reduces proportionally to the length of the cyclic prefix that is added to the DMT symbols so that the length of the cyclic extension of DMT symbols is preferably limited. The cyclic prefix should preferable be long enough so that channel delay or spreading of one symbol can be absorbed into the cyclic prefix time period. In this way intersymbol interference can be reduced. If the channel impulse response is longer than the cyclic extension, some ISI will remain.

Another known countermeasure to shorten the channel's impulse response is a time domain equalizer. Time domain equalizers (TEQ) typically contain a set of adaptive taps whose values are set in accordance with a mean square error (MSE) criterion. In a typical receiver as shown in FIG. 1, the TEQ is followed by a serial to parallel converter which also acts to extract the cyclic prefix from the multicarrier symbol to output a non-extended multicarrier symbol. This is applied to a Discrete Fourier Transformer (DFT), typically implemented as a Fast Fourier Transformer (FFT unit) for time to frequency domain conversion, since the FFT (Fast Fourier Transform) algorithm is an efficient way of calculating a DFT. This is followed by a frequency domain equalizer FEQ which typically contains one complex tap per carrier to compensate for each carrier any remaining phase rotation and attenuation due to transmission over the channel. The outputs are fed to a demapper DMAP which decodes the appropriate number of bits from each carrier using a selected constellation scheme, and the bits are converted to a serial stream by parallel to serial convertor P/S.

An improved multicarrier receiver RX known from EP 969 637 A1 is shown schematically in FIG. 2. More details may be found in "Per tone Equalization for DMT-Based systems" by Van Acker et al, IEEE Transactions on communications, Vol. 49 No1 January 2001. Both EP 969 637 and the Van Acker article are incorporated herein by reference. In this case, the TEQ is dispensed with and a time domain equalization is carried out in the frequency domain. The key advantage of this is that it enables different amounts of time domain equalization to be carried out on each of the carriers, i.e. a separation of the equalizing function with frequency. As shown in the figure, the samples of the cyclically extended multicarrier symbol MS, when received by the multicarrier receiver RX', are converted to parallel form as by the serial to parallel converter S/P. The extended multicarrier symbol MS then is fed to the sliding fast Fourier transformer SLIDING FFT which converts the extended multicarrier symbol MS into the frequency domain by calculating several consecutive Fourier transformations.

A complete calculation of these FFTs would be very computationally intensive. However, a sliding DFT (be it implemented using the FFT algorithm) can be derived from one FFT and difference terms. Therefore, in practice the FFTs are replaced by one full FFT and difference terms, without sacrificing performance. The difference terms are formed as differences between incoming samples that are separated by a distance equal to the FFT size.

The parts of the extended multicarrier symbol MS that are transformed (by the FFTs) all have the length of a non-extended multicarrier symbol, i.e. the Fast Fourier Transform (FFT) size. The sliding fast Fourier transformer SLIDING FFT in this way calculates at most an amount of Fourier transforms equal to the number taps of the tapped delay lines $TD1, TD2, \ldots, TDN/2$ in the per-carrier frequency domain equalizer PC-FEQ, also called a per-tone equalizer. The resulting frequency domain multicarrier symbols are applied to the PC-FEQ where each carrier is equalized by an individual equalizer or tapped delay line. The number of complex taps per tapped delay line does not necessarily have to be the same for each tapped delay line, but could be a maximum of T taps per line. The equalized carriers at the output of the per-carrier frequency domain equalizer PC-FEQ are fed as in FIG. 1 to the demapper DMAP' and the parallel to serial converter P/S'. There is also mention that the equalizer length can be varied per tone and set to zero for non-used tones, to reduce complexity.

It is known from "Frequency Domain equalization with tone grouping in DMT/ADSL-receivers" by Van Acker et al, 1999 IEEE BNSDOCID:<XP_10373800A_I_>, which is also incorporated herein by reference, to apply the equalisation to groups of tones rather than every tone individually, to reduce the complexity in terms of computational load and memory requirements. For each group the optimal per tone equalizer is computed for the centre tone and reused for the whole group.

A further attempt to improve the performance without unduly increasing complexity is shown in EP1296492 and involves windowing in the receiver to reduce the effect of transitions that would otherwise cause intersymbol and intercarrier interference. It can help to reduce the spectral leakage effects due to the bad spectral containment of the DFT operation. Hence, Radio Frequency Interference (RFI) and crosstalk will only affect a limited number of carriers. This known patent application shows a combination of the benefits of the per-tone equalization and of windowing. Complexity is still a limiting factor, and more so with the advent of ADSL+, a new standard based on ADSL where the number of tones in the downstream band has been doubled (from 256 to 512). The upstream band remains the same of ADSL.

Useful general information on ADSL systems can be found in "ADSL, VDSL, and Multicarrier Modulation, by J. A. C. Bingham, Wiley, 2000.

SUMMARY OF THE INVENTION

An object of the present invention is to provide an equalizer and an equalization method with an improved performance for a given complexity.

According to a first aspect, the invention provides:

an equalizer for a multi carrier signal for carrying out equalization adapted to each carrier or group of carriers, comprising means for Fourier transforming the multi carrier signal, means for obtaining difference terms of the multi carrier signal and a filter for adaptively filtering the difference terms and an output of the Fourier transformation, to output equalized signals, wherein decimation is applied to at least some of the difference terms input to the filter.

This enables the complexity to be reduced for a given performance level. In particular since only non-zero filter taps need to be stored and updated, coefficient memory and coefficient calculation capacity can be reduced.

Additional features suitable for dependent claims include the following:

The length of the equalizer for each tone is selectable by a selecting means, for example the number of taps allocated to equalize that tone.

Global optimizion heuristic algorithms may be used to adapt the filter size based on the comparison between a noise measurement and an optimal performance figure achieved in a previous ISI-ICI free measurement phase.

The amount of decimation may be selected in accordance with a noise measurement, i.e. in an embodiment of the present invention a selection can be made between decimation on or decimation off. The decimation or non-decimation of the difference terms can be selected independently for each tone, e.g. based upon algorithms which aim to optimize the global bit-rate, e.g. given a fixed and limited amount of equalizer memory and processing power.

Further such additional features include determining and storing two RLS data structures for non-decimated and decimated difference terms for use in training taps of the adaptive filter. Per-tone RLS selection (decimated or non-decimated) can be incorporated. Further reduction in complexity can be obtained by per-tone filter size optimization (also termed optimal loading). The size can be determined based on noise figures for the different carriers. This can be in the form of a figure relative to an upper bound performance determined using a REVERB noise for example. Depending on measured noise, groups can be reallocated to miss out carriers which are too noisy to carry any data. Also depending on measured noise, the tone selected as the central tone for a group can be changed if it is too noisy. The optimization of size of the filter (also called order-update) for each carrier can be carried out so as to maximise not the individual carrier performance, but the global performance of all the carriers in terms of overall bit-rate, given an available budget of an average number of filter taps per tone for example.

Another aspect of the invention provides: an equalizer for a multi carrier signal for carrying out equalization adapted to each carrier or group of carriers, comprising means for Fourier transforming the multi carrier signal, and a filter for adaptively filtering outputs of the Fourier transformation, to output equalized signals, including means for measuring noise for at least some of the carriers, and means for dynamically adapting a size of the filter to differ for different ones of the carriers according to the measured noise for the carriers.

An advantage of these features is that the complexity can be reduced for a given level of performance.

As additional features suitable for dependent claims, the Fourier transforming means is a sliding Fourier transform means. Or, the equalizer has means for obtaining difference terms and the filter takes these as inputs as well. The noise figure can be in the form of a figure relative to an upper bound performance determined using a REVERB noise for example. Depending on measured noise, groups can be reallocated to miss out carriers which are too noisy to carry any data. Also depending on measured noise, the tone selected as the central tone for a group can be changed if it is too noisy. The optimization of size of the filter (also called order-update) for each carrier can be carried out so as to maximize not the individual carrier performance, but the global performance of all the carriers in terms of overall bit-rate, given an available budget of an average number of filter taps per tone for example.

The equalizer can be suitable for ADSL+ multi carrier signals. It can be implemented all or part in software or all in hardware.

For hardware implementations there is a benefit of silicon area reduction. Other advantages in approximate order of priority, include one or more of the following:

Reduction of average filter size (total coefficients memory).

Limit processing power for filtering (e.g. to the same order of magnitude as currently used for ADSL signals).

Provide excellent equalization in the presence of RFI and bridged loops. This is because the order-update concentrates the equalizer taps around the frequency band where the bridged-tap or the RFI is.

Maintain or improve performance compared to current ADSL equalizers.

Other aspects of the invention include corresponding methods of equalizing, and methods of offering a communication service over a link having an equalizer as set out above. The advantages of the equipment can result in added value of such services, which can in some circumstances be much greater than the value of the equipment, in which case claiming such services directly is valuable. Another aspect provides signals equalized by the above equalizer.

Any of the additional features can be combined with any other of the features, and can be combined with any of the aspects of the invention, as would be apparent to those skilled in the art. Other advantages may become apparent. How the present invention may be put into effect will now be described with reference to the appended schematic drawings. Obviously, numerous variations and modifications can be made without departing from the spirit of the present invention. Therefore, it should be clearly understood that the form of the present invention is illustrative only and is not intended to limit the scope of the present invention.

BRIEF DESCRIPTION OF THE DRAWINGS

The features of the invention will be better understood by reference to the accompanying drawings, which illustrate preferred embodiments of the invention. In the drawings:

FIG. 3 shows a prior art DMT symbol as received by the canonical structure of the per-tone equalizer of a prior art filter arrangement.

FIG. 4 shows a prior art filter arrangement.

FIGS. 5, 6 and 7 show filter arrangements according to embodiments of the invention.

FIG. 8 shows v to w to v procedures for non decimated and decimated groups according to embodiments of the invention.

FIG. 9 shows an update sequence according to an embodiment of the invention.

FIG. 10 shows a data structure for taps training according to an embodiment of the invention.

FIG. 11 shows a hardware and software architecture according to an embodiment of the present invention.

DESCRIPTION OF THE PREFERRED EMBODIMENTS

Figure 1:
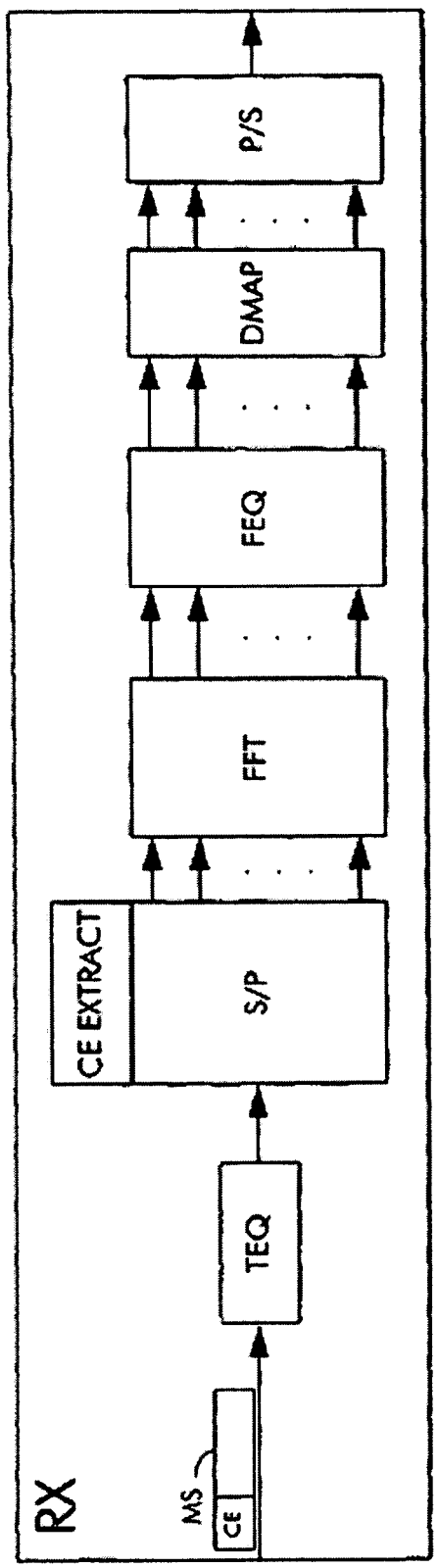
FIGS. 1 and 2 show prior art equalizers.
Figure 2:
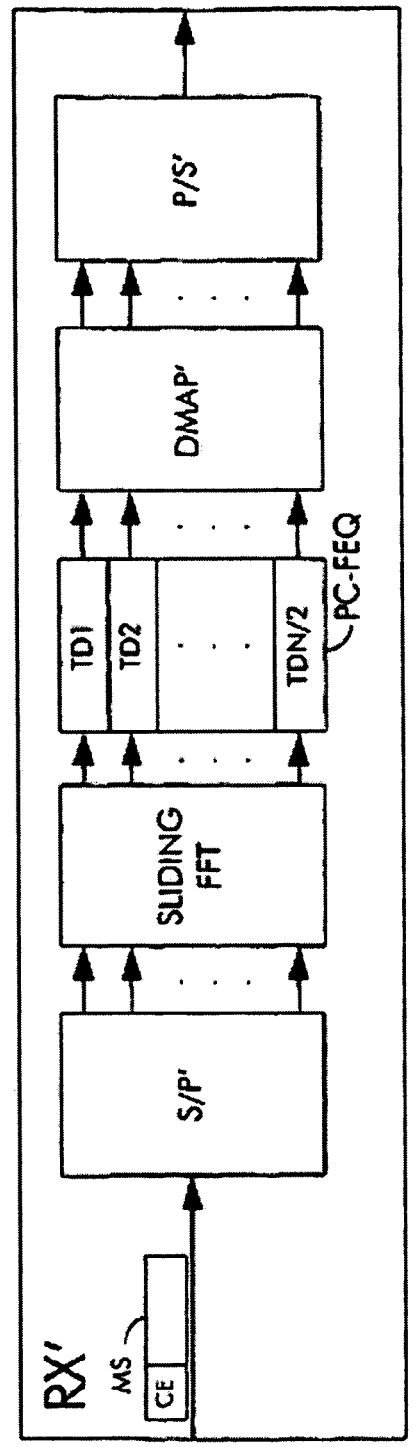

The present invention will now be described with reference to certain embodiments and with reference to the above mentioned drawings. Such description is by way of example only and the invention is not limited thereto. For example, the embodiments described by way of example are based on examples suitable for ADSL+ while limiting any complexity increase with respect to ADSL. However, the present invention may find wider application than ADSL, e.g. in any multicarrier telecommunication system, either terrestrial or satellite. They will be described relative to a conventional structure referred to as PTEQ, and as described in the Van Acker papers referenced above and incorporated herein by reference. The embodiments of the present invention will be called PTEQ-Plus equalizers. With a main target of silicon area reduction, they can make feasible the tone-extension for ADSL+. The requirements, in order of priority, are at least one and preferably more of the following:

- Reduce the average PTEQ size (coefficients memory).
- Limit the processing power for filtering within current capabilities.
- Provide excellent equalization in presence of RFI (radio frequency interference) and bridged loops.
- Keep the same or better performance than current ADSL equalizers (when comparable).

To address these requirements, new features of the PTEQ-Plus equalizer which are described below are one or more of:

- Decimation of the difference terms, new v->w->v for side-tones filtering
- Two RLS for non-decimated and decimated difference terms
- Per-tone (or per-group) RLS selection (decimated or non-decimated)
- Per-tone (or per-group) PTEQ size optimization, e.g. to select a different equalizer size for each tone or group of tones, i.e. optimal loading)
- REVERB SNR Measure, group relocation and central tones selection
- Global bit-rate optimization (order-update)

By way of introduction to the description of some embodiments of the invention, the operation of a Per-Tone equalizer filter-bank will be discussed. It starts from the following relationship:

$$Z_i^{(k)} = D_i \cdot row_i(F_N) \cdot (Y \cdot w)$$

$$= row_i \underbrace{(F_N \cdot Y)}_{TFFT} \cdot \underbrace{w \cdot D_i}_{w_i}$$

Eq. 1

Where Y is the state vector of the received signal, Z the received constellation, w the TEQ, D the FEQ, $F_N$ the Fourier matrix of order N, i and k are the tone and symbol indexes, T is the TEQ size in terms of numbers of taps and $w_i$ the complex TEQ for tone i. Because of the Toeplitz structure of the matrix Y, the T FFTs can be replaced by a sliding FFT over the vector of received samples y. The vector y is of size N+T−1 and is obtained from the received DMT symbol as shown in FIG. 3 (CP is the size of the cyclic-prefix). For any T-taps FEQ filter $w_i$, There exists a modified T-taps FEQ $v_i$ which has as inputs only one FFT and T−1 real difference terms, as shown in FIG. 4.

The sliding-FFT can be expressed as (the notation $\overline{w}_i$ denotes vector $w_i$ with its elements in reverse order):

$$Z_i^{(k)} = \overline{w}_i^T \cdot \begin{bmatrix} F_N(i,:) & 0 & \cdots \\ & \ddots & \\ 0 & \cdots & F_N(i,:) \end{bmatrix} \cdot y$$

Eq. 2

The sliding-FFT can be expressed as a single FFT plus a filtering operation on the difference terms of y:

$$Z_i^{(k)} = \overline{v}_i^T \cdot \left[ \begin{array}{c|c} I_{T-1} & O \mid -I_{T-1} \\ \hline O & F_N(i,:) \end{array} \right] \cdot y$$

Eq. 3

Where $I_{T-1}$ is the identity matrix of order T−1 and the $\overline{w}_i$ and $\overline{v}_i$ are related by the following recursion formula, for tone i=1 . . . N and tap t=0 . . . T−2:

$$v_{i,t+1} \cdot a^{i-1} + w_{i,t} = v_{i,t}$$

$$a = e^{-j2\pi/N}$$

$$v_{i,T-1} = w_{i,T-1}$$

Eq. 4

The inverse transformation is the following:

$$-v_{i,t+1} \cdot a^{i-1} + v_{i,t} = w_{i,t}$$

$$a = e^{-j2\pi/N}$$

$$v_{i,T-1} = w_{i,T-1}$$

Eq. 5

Using a more compact functional notation with tone index i=1 . . . N:

$$v_i = v2w(w_i, i, N)$$

$$w_i = w2v(v_i, i, N)$$

Eq. 6

Equation 3 defines a PTEQ filter bank, as shown in FIG. 4. This figure shows an FFT N followed by the PTEQ filter bank N,T. The filter bank receives v representing coefficients which are in the PTEQ-Plus coefficients matrix and receives the difference terms, and outputs the received equalized constellation Z for demapping.

With the existing PTEQ structure, by just extending the number of tones from 256 to 512, the number of PTEQ taps must be doubled to keep the same performance. ADSL+ curves for 2T taps PTEQ give SNR comparable to ADSL with T taps PTEQ.

FIG. 5 shows an architecture according to an embodiment of the present invention. The inputs Y are fed to an FFT unit 2, and to a differences block 4 for obtaining differences between incoming samples. The PTEQ filter 8 takes as inputs the FFT unit outputs and the difference terms, at least some of which are passed through a decimation block 6.

Decimation

When the receive sampling frequency is doubled, the channel impulse response length (in samples) is also doubled. Assuming the length of the equalizer to be proportional to the length of the channel, then it is expected that to keep the same performance of an ADSL system, the equalizer length must also be doubled. Instead of having two times the number of taps, these are spaced in time applying decimation. Simulations show that performance of a decimated PTEQ approaches that of a standard PTEQ of doubled size. One big advantage of decimation is that only non-zero taps have to be stored and updated.

FIG. 6 shows an architecture according to another embodiment of the present invention. As in FIG. 5, the inputs Y are fed to an FFT block 2, and to a differences block 4 for obtaining differences between incoming samples. The PTEQ filter 8 takes as inputs the FFT unit output and the difference terms. In this case, a block 10 for per tone filter size control is shown. This is based on feedback from the filter output.

Optimal Load

The Standard-PTEQ size is preferably constant for all the central-tones and preferably dimensioned for the worst case. This size can be optimized tone by tone so that the average number of taps can be significantly lowered. The process of selecting a PTEQ size for each tone will be referred in the following as loading. Optimal loading algorithms are algorithms which try to maximize the performance given an average number of taps/tone as an available budget.

FIG. 7 shows an architecture according to another embodiment of the present invention. This combines the decimation of FIG. 5 and the filter size control of FIG. 6 and other features which can be added selectively as desired. The inputs Y are fed to an FFT N unit 2 in this case preceded by a prefix extraction block 1. The output of the FFT unit 2 is fed to a PTEQ-plus filter block 8. Another input is difference terms of the input from a difference block 4. The PTEQ-plus filter block 8 is fed by a central tones table 18 for adapting the filters including the size of the filters for each tone. This tones table 18 is adapted by a PTEQ-plus UPDATE block 16. The update block 16 is fed by an error signal representing a noise figure, generated by a subtractor 14. The subtractor 14 is fed by the output of the filter block 8 and a version of the output of the equalizer after passing through a slicer 12.

Filtering

All the basic considerations made for the Standard-PTEQ described in the above mentioned Van Acker papers are maintained. For the PTEQ-Plus, the number of central tones is doubled to match the revised ADSL+ standard. Additionally, each group can be decimated. This information is stored in one bit per central tone in the Central-Tones Table with the following meaning:

0=standard (non-decimated) group
1=decimated group

For decimated groups, the v->w->v procedure is changed as explained in FIG. 8. As only the PTEQ-Plus equalizer is trained for CENTRAL-TONES, a v->w->v procedure is required to compute the equalizers for the SIDE-TONES in the same group, see e.g. the paper of Van Acker about tone-grouping. A v->w->v procedure is required because the v coefficients cannot be simply copied from the central tone to the side-tones. Tone-grouping is used because then only the central-tones coefficients of the PTEQ (and PTEQ-Plus) need to be stored. The side-tones coefficients can be computed on-line, on the fly, in a temporary buffer for each side-tone at a time, used and then discarded. This allows a saving in memory as only the central tones are stored in exchange of an increased processing powers during the filtering operation required to compute on-line the v->w->v. Processing power is normally more available than physical memory for side-tones coefficients.

When decimation is introduced, the basic scheme remains basically unchanged. The only difference is that now, when a group is decimated, the coefficients have to be interpolated (zero insertion) before the standard v->w->v operation is applied to the interpolated coefficient vector. The way this interpolation has to be done is exactly indicated in the FIG. 8 (see decimated central tone upsampling layer). This figure indicates how the v->w->v operation has to be modified with respect to the standard per-tone equalizer when decimation is introduced.

For a decimated central-tone, only the non-zero coefficients are stored. Before applying the standard v->w->v, these coefficients have to be up-sampled by inserting zeros. As a result, the complexity to filter a side-tone in a decimated group is $2*(T-1)$ taps, where T is the number of taps actually stored.

Initial Configuration

This phase occurs before any PTEQ update. Its purpose is to choose the initial values for the following parameters (their value will not change during the update):

number of central tones
group sizes and position
central-tones position within the group.

The steps to compute these initial parameters are the following:

Build the default central tones table 18.
Based on default central-tones reverb SNR reallocate unused groups.
Based on side-tones reverb SNR chose the central tone in each group.

Default Central Tones Table

For each group, the central-tones table 18 contains all the information required for filtering, e.g.:

Group size
Central tone position
Decimation or Non-Decimation bit
PTEQ Size (i.e. number of coefficients for each central-tone)
Pointer to the corresponding PTEQ coefficients The central tones table 18 is set to its default value based on the following parameters:

First downstream tone to equalize
Last downstream tone to equalize (number of tones)
Initial (constant for all the groups) grouping size The central tone table 18 is initialized by setting all the groups to the same group size, all the central-tone sizes to the same size (constant load), all the groups to decimated. The position of the central tone within each group is initialized as the central position in that group.

REVERB SNR Measure

Far-End signal measurement and noise measurement are done during a REVERB phase (an example of an ISI-ICI free phase). The resulting SNR for all the tones (including side-tones) is computed and represent the upper bound SNR for the PTEQ update. This SNR is also used during initial configuration to select the optimal initial values mentioned above.

Unused Groups Relocation

This phase of initial configuration detects the groups where the REVERB SNR for the central tone is below a specified threshold (e.g. below zero dB). These groups will not carry any bit-rate, so there's no reason to equalize them. The PTEQ taps can hence be reallocated by reducing the group size for some other groups. The central tones taps for the groups with low SNR are distributed uniformly among the remaining groups.

Central Tones Selection

This phase selects the position of the central tone within each group. The variation between minimum and maximum REVERB SNR in the group is computed. If this variation is above a specified threshold then the central tone is positioned at the tone with the maximum SNR, otherwise the default position is chosen (i.e. in the middle of the group).

When high SNR variations appear in a group, then RFI is probable and moving the central tone position from the middle can improve performance despite the downside of having a worse side-tone equalization.

Update

The PTEQ-Plus update sequence is shown in FIG. 9. The equalizer coefficients are trained in this phase up to their final values. The complete update takes $t_{max}$, e.g. 2000 iterations. The update will look for an optimal load as defined above by alternating coefficients training with the adjustments of the size of each equalizer (Order Update).

Starting Configuration

Referring to FIG. 9, at the first update iteration ($t_0$), the PTEQ-Plus will be using the Initial Configuration as defined above. Moreover, all the groups will be set to 'decimated' and the load (equalizer size) will be set to constant and equal to a specified INITIAL_LOAD value. This configuration will be kept until the first load time ($t_1$).

Taps Training

The basic Square-Root Free, Inverse Update, RLS-LMS scheme is explained in more detail in the Van Ackers papers referenced above. Some differences relevant for embodiments of the present invention are:

1. The RLS and LMS (m and l) are de-coupled, the new update formula is:

$$v_1^{k+1} = v_1^k + \frac{\mu}{eFY_i} FFT_i^* \cdot e_i \quad \text{(Eq. 6)}$$

$$v_n^{k+1} = (v_n^{k+1} + \lambda K_T \cdot \overline{e}_i) \ (n = 2 \ldots T - 1)$$

$$\overline{e}_i = e_i \frac{\mu_{SCALE}}{FEQ_i \cdot rotor_i} \ (i = \text{central tone})$$

where:
v are the PTEQ-Plus coefficients
$FFT_i$ is the FFT output for tone i
μ and l are the LMS, RLS gains
$m_{SCALE}$ is an additional scaling coefficient
$e_i$ is the error at the output of the demapper for tone i
$FEQ_i$ and rotors are the FEQ and rotor for tone i
$K_T$ is the Kalman RLS gain for the equalizer size T
$eFY_i$ is the estimated signal energy for the tone i 2. The Kalman gain is computed and stored for a limited number of sizes. The order update algorithm (described below) will be allowed to choose only among these sizes. The maximum size of the Kalman gain will coincide with the size of the S matrix.

3. Two RLS using decimated and non-decimated difference terms are computed and stored. For each RLS a different set of data structure must be stored, as shown in FIG. 10, common-part.

FIG. 10 refers to the data-structures that have to be kept and updated when the INVERSE UPDATE SQUARE-ROOT FREE RLS algorithm and the PTEQ RLS/LMS update algorithm are implemented. The S Matrix represents the inverse of the QR-Decomposition matrix R of the autocorrelation matrix Xuu of the input signal in an RLS algorithm. The d vector is a status vector used to implement a SQUARE-ROOT FREE version of this inverse update RLS algorithm. K is a cell-array (an array with elements of different sizes) containing the Kalman-Gain to be used in the PTEQ-Plus coefficient update formula, again accordingly to an Inverse-Update SRF-RLS.

The skilled person is aware of the theory of such adaptive algorithms, in fact most of them are variants of the well-known RLS algorithm.

S,d,K are status data-structures relative to the RLS part of the PTEQ-Plus update algorithm. This is also known as the "common" part, common in the sense that it is shared by all the tones.

eFY represents the estimated power of the output of the FFT unit. It is a data structure (an array) relative to the normalized LMS or "specific" part, specific in the sense that it is specific for each different tone. eFY serves to normalize the LMS (i.e. divide the conjugate of the FFT output by its estimated power). The NORMALIZED LMS algorithm is also a well-known algorithm.

SNR Drop Estimation

The algorithms for optimal loading require, for each central-tone, a measure of the distance from the current performance to the upper bound performance given by the REVERB SNR. For this reason the current error power $\hat{P}_{err,i}^k$ at iteration k and central-tone i is continuously estimated using the adaptive formula:

$$\hat{P}_{err,i}^k = \hat{P}_{err,i}^{k-1} + \lambda_{EST} \cdot e_i^k \cdot \text{conj}(e_i^k) \quad \text{Eq. 7}$$

where:
$e_i^k$ is the instantaneous error at the output of the monitor for the central-tone i
$\lambda_{EST}$ is a recursion gain smaller than '1'

The SNR drop (in linear scale) from the REVERB SNR, for the central-tone i is then estimated as follows:

$$SNR_{DROP,i}^k = SNR_{REVERB,i}^k \cdot \hat{P}_{err,i}^k \cdot G_i \cdot C \quad \text{Eq. 8}$$

where:
$G_i$ is the group-size for the central-tone i
C is a constant value, (Note: this value is not relevant as the optimal loading algorithms only compare different SNR drops and do not use the absolute value of the drop itself)

First Load

The first load algorithm is executed only once during the PTEQ-Plus update. Its purpose is to reduce the number of CPU cycles required to implement the filter-bank by splitting the groups into decimated and non-decimated.

As explained in above, filtering a decimated tone with coefficients size T require as many cycles as filtering a non-decimated tone of size 2*(T−1). If the budget of CPU cycles per DMT symbol in the filtering machine is limited, some groups will be forced to be non-decimated.

As decimated groups are expected to give better performance, the non-decimated groups will be chosen among those which, at the time of the first load ($t_1$), exhibit the smallest $SNR_{DROP}$.

The algorithm sorts the central-tones by increasing $SNR_{DROP}$ and allocating a fraction of the used groups (STD_DEC_SPLIT) to the non-decimated RLS by re-setting the corresponding bit in the central tones table. The size of the coefficients for the selected non-decimated central-tones is set to the value (STD_INITIAL_LOAD) and the coefficients are initialized to the 'transparent' value (i.e. first coefficient set to '1' all the others set to '0').

Order Update

The order update algorithm is executed few times at the early phase of the PTEQ-Plus update. Its purpose is to implement an optimal loading by dynamically adjusting the equalizer size for each central-tone. The performance is globally maximized and the memory requirements for the coefficients are kept low as explained above. The sizes (orders) of the PTEQ-Plus coefficients vectors are never decreased by an order update. They can only be increased or left unchanged. The main assumption is that the Kalman gain for the extended order $K_{T+D}$ can be computed starting from the Kalman gain $K_T$ for the order T with a small effort, and that they do not differ too much in the first T−1 elements. This also means that after an order update, the coefficients can be trained starting from their previous-order values by appending D trailing zeros.

The algorithm sorts the central-tones by decreasing $SNR_{DROP}$. It then computes a budget of available taps that can be appended to the existing PTEQ-Plus coefficients. This budget can be computed based on the total amount of free tap memory and based on the planned number of order update still to be done, by just splitting this available memory in equal parts. For example, if 4 order updates are planned and the total free memory is 200 taps, then for each order update a budged of 200/4=50 taps is computed and made available for equalizer length extention.

Starting from the central tone with maximum $SNR_{DROP}$ and proceeding with central tones with lower $SNR_{DROP}$ (i.e. following the natural order of the sorted central-tones) the algorithm selectively extends the equalizer length for that central tone by a fixed amount of taps (for example 4 taps). This is done until all the taps in the budget are allocated. If the end of the central tones is reached and still there are available taps in the budget, then the process is repeated following again the same order of central-tones (i.e. in this case some central tones could receive multiple of 4 taps as from previous example).

Example Configuration

An example is provided of how to configure the basic parameters which in turn control the order-update algorithm. The following basic constants define the physical size of the central tone table and the vi memory. They are used to build the default central tones table:

| | |
|---|---|
| CTT_MAX_NCT = 96 | // max. number of central tones in CTT |
| CTT_TAPS_AVAIL = 22 | // taps per central-tone available |
| CTT_GROUPING = 5 | // default grouping |
| DFE_N_RX = 1024 | // FFT points RX |
| FIRST_TONE = 33 | // First equalized tone |
| LAST_TONE = 511 | // last equalized tone |

Given these physical constraints, an example of order update parameters is provided the following table. The order update parameters define the main memory requirements for the update algorithm. They also indirectly define the average cycle load of the PTEQ filtering processor and the overhead associated to the order update itself respect with normal taps training. The number of RLS iterations available for training is assumed equal to a certain number such as 2000.

| Parameter | Value | Note |
|---|---|---|
| MAX_LOAD_DEC | 32 | Maximum equalized length that will be allocated for a decimated group |
| TARGET_AVG_LOAD_DEC | 22 | Normally same as CTT_TAPS_AVAIL. This is the average load targeted by the order update. Even if taps distribution can change over central tones, the final average value over all (decimated) central tones will be less than or equal to this. |
| INITIAL_LOAD_DEC | 16 | Initial number of taps for decimated groups. |
| LOAD_STEP_DEC | 4 | Each time a decimated group has to be increased in size, this is the amount of taps of the increase. Equalizer size increase only happens in steps of this value. |
| INITIAL_LOAD_STD | 16 | Initial number of taps for non-decimated groups. |
| MAX_LOAD_STD | 16 | No order update is performed on non-decimated groups. So the maximum and initial load coincide. |
| STD_DEC_SPLIT | 0.25 | Is the fraction of all groups which will be forced non-decimated. |
| ORDER_UPDATE_AT | 200 400 600 800 | This is a set of iteration indexes at which an order update will happen. Iteration index start at 0 and is increased by 1 at each RLS update iteration. |
| FIRST_LOAD_AT | 100 | This is the iteration index at which the first load is performed. |

Implementation

An embodiment of the present invention is shown schematically in FIG. 11, which shows part of a receiver for carrying out equalisation in accordance with the present invention. This comprises a programmable processing engine such as a microprocessor which may be embedded on a suitable chip or on a printed circuit board. A suitable processor, for example, can be an ARM core, see for example the book "ARM System-on-Chip Architecture", by S. Furber, $2^{nd}$ ed., Addison Wesley, 2000. The ARM core is provided with a suitable bus system which connects the processing core with memory, e.g. SRAM as well as optionally DRAM, e.g. for storing internal data structures 28 and read only memory 26 (ROM) and suitable input/output ports. The memory includes memory 18 for the Central Tones Table, memory 22 for storing information for the FEQ, and memory 24 for storing the v coefficients for the PTEQ-Plus filter 8 calculated by the v–w–v operation. In addition, other known elements may be included—e.g. a unit to control interrupts as well as buffers. The equaliser shown in FIG. 11 may included within a modem, e.g. an ADSL modem.

The processing engine executes software to implement the above algorithms, e.g. the intial configuartion algorithm, the update algorithm and the modified v–w–v algorithm of FIG. 8. This may be achieved by a PTEQ-Plus update unit 16 as well as a module 30 for determining the initial configuration. The complete PTEQ-Plus update unit 16 may be implemented as a modular electronic component, e.g. an ASIC. Suitable software may be written in a computer language such as C or C++ and compiled for the relevant micoroprocessor. The software for implementing the PTEQ-Plus update unit 16 may comprise sub-routines or modules for carrying out elements of the algorithm described above, e.g. an order update module 34, a first load module 36, a taps training module 38 as well as the intial configuration module 30.

The receiver of FIG. 11 may include a received signal filter 32 which receives an input signal feeds an output signal to the cyclic prefix extractor 1. The signal with the cyclic prfeix extracted to fed to an FFT unit 2 and from there to a PTEQ-Plus filter unit 8, whereby the unit 8 also receives the difference terms from uint 4 and an optionally independently selectably decimated output from unit 6 as described above with respect to FIGS. 5 and FIG. 7. An output from the filter 32 is also provided as input for the taps training module 38.

The inputs to the PTEQ-Plus filter unit 8 are from the Central Tones Table memory 18 and the v coefficients memory 24. The entries for the central tones table are calculated by the algorithm described above. Initial values for these memories may be provided from the initial configuration module 30 in accordance with the algorithm described above (default central tones table).

The output of the PTEQ-Plus filter unit 8 is fed to an FEQ unit 20 with associated memory 22. Outputs of the FEQ unit 20 are the $FEQ_i$ and rotor for tone I required by the taps training module 38 in accordance with equation 6. Another output of FEQ unit 20 is fed to the demapper 26. An error signal $e_i$ for tone i is generated by a subtractor 14 which is also fed to the taps training module 38 in accordance with equation 6. The order update module 34 and the first load module 36 execute an algorithm and operate as described above.

Although FIG. 11 has been described as a mix of hardware and software solutions, the complete equalizer may be implemented in software or hardware.

Hence the present invention includes a software product which when executed on a suitable processing engine provides an equalizer for a multi carrier signal for carrying out equalization adapted to each carrier or group of carriers. The software, when executed may provide means for Fourier transforming the multi carrier signal, means for obtaining difference terms of the multi carrier signal and a filter for adaptively filtering the difference terms and an output of the Fourier transformation, to output equalized signals. In particular, the software, when executed may provide means for decimation applied to at least some of the difference terms input to the filter, independently of whether the above items are provided by software or hardware. The software, when executed may also provide the decimation or non-decimation of the difference terms which are selected independently. Further, the software, when executed, may provide means for selecting whether decimation is applied on a per tone or per group basis. Further, means for measuring noise on at least some of the carriers may be provided and the software, when executed, may provide means for arranged to select an amount of decimation according to the noise. The software, when executed, may provide means for equalization of a central carrier of a group of carriers. The software, when executed, may provide means for filter side-carriers of the group according to the adaptation for the central tone and according to an amount of decimation selected for the group. A first stored RLS data structure for non-decimated difference terms and a second stored RLS data structure for decimated difference terms, for use in training the filter may be provided, and the software, when executed may provide means for selecting the first or the second RLS data structure for each carrier or group of carriers. Means for measuring noise for at least some of the carriers may be provided, and the software, when executed, may provide means for dynamically adapting a size of the filter to differ for different ones of the carriers according to the measured noise for the carriers. The software, when executed may provide, means to miss out those carriers which are too noisy to carry any data. The software, when executed, may provide means to alter which carrier of a group is selected as the central carrier if the current central carrier is too noisy. The software, when executed, may provide means to determine an overall bit-rate for all the carriers, and to determine the size of the filter for each carrier or group of carriers according to the overall bit rate.

In conclusion: As has been described above, an equalizer for a multi carrier signal for carrying out time domain equalization adapted to each carrier or group of carriers, Fourier transforms the multi carrier signal, and obtains difference terms of the multi carrier signal. Both are inputs to an adaptive filter, to output equalized signals, wherein decimation is applied to at least some of the difference terms input to the filter. This is notable for enabling the complexity to be reduced for a given performance level. In particular since only non-zero filter taps need to be stored and updated, coefficient memory and coefficient calculation capacity can be reduced. Another way to reduce complexity involves measuring noise for at least some of the carriers, and dynamically adapting a size of the filter on a per carrier basis according to the noise.

What is claimed is:

1. An equalizer for a multi carrier signal for carrying out equalization adapted to each carrier or group of carriers, comprising:
    means for Fourier transforming the multi carrier signal;
    means for obtaining difference terms of the multi carrier signal; and
    a per-carrier frequency domain equalizer filter for adaptively filtering the difference terms and an output of the Fourier transformation based at least in part on filter coefficients received as input to the per-carrier frequency domain equalizer filter, to output equalized signals, wherein decimation is applied to at least some of the difference terms input to the per-carrier frequency domain equalizer filter, and wherein interpolation is applied to at least some of the per-carrier frequency domain equalizer filter coefficients.

2. The equalizer of claim 1 wherein the decimation or non-decimation of the difference terms can be selected independently.

3. The equalizer of claim 2, comprising means for selecting whether decimation is applied on a per tone or per group basis.

4. The equalizer of claim 2, having means for measuring noise on at least some of the carriers and arranged to select an amount of decimation according to the noise.

5. The equalizer of claim 4, arranged to determine noise for a carrier relative to an upper bound performance determined using a signal free of inter symbol or inter carrier interference.

6. The equalizer of claim 1, the filter being adapted for equalization of a central carrier of a group of carriers.

7. The equalizer of claim 6, arranged to filter side-carriers of the group according to the adaptation for the central tone and according to an amount of decimation selected for the group.

8. The equalizer of claim 1, having a first stored Recursive Least Squares (RLS) data structure for non-decimated difference terms and a second stored RLS data structure for decimated difference terms, for use in training the filter.

9. The equalizer of claim 8 having a selector for selecting the first or the second stored RLS data structure for each carrier or group of carriers.

10. The equalizer of claim 1 having means for measuring noise for at least some of the carriers, and means for dynamically adapting a size of the filter to differ for different ones of the carriers according to the measured noise for the carriers.

11. The equalizer of claim 10 having means for comparing the measured noise for a carrier to an upper bound performance determined using a signal free of inter symbol or inter carrier interference.

12. The equalizer of claim 1, arranged to remove those carriers which are too noisy to carry any data.

13. The equalizer of claim 6, arranged to alter which carrier of a group is selected as the central carrier if the current central carrier is too noisy.

14. The equalizer of claim 10, arranged to determine an overall bit-rate for all the carriers, and determine the size of the filter for each carrier or group of carriers according to the overall bit rate.

15. The equalizer of claim 1 arranged for equalizing Asymmetric Digital Subscriber Line Plus (ADSL+) multi carrier signals.

16. Software for implementing the equalizer of claim 1.

17. A method of offering a communication service over a link having the equalizer of claim 1.

18. An equalized signal equalized by the equalizer of claim 1.

19. A method of equalizing a multi carrier signal by carrying out equalization adapted to each carrier or group of carriers, the method comprising:
 Fourier transforming the multi carrier signal;
 obtaining difference terms of the multi carrier signal;
 adaptively filtering the difference terms and an output of the Fourier transformation using a per-carrier frequency domain equalizer filter, based at least in part on filter coefficients received as input to the per-carrier frequency domain equalizer filter, to output equalized signals;
 applying decimation to at least some of the difference terms input to the per-carrier frequency domain equalizer filter; and
 applying interpolation to at least some of the filter coefficients input to the per-carrier frequency domain equalizer filter.

20. A multi carrier signal equalizer configured to carry out equalization per carrier or per group of carriers, the equalizer comprising:
 a Fourier transformation unit to Fourier transform a multi carrier input signal;
 a differences unit to generate difference terms from the multi carrier input signal; and
 a per-carrier frequency domain equalizer filter to adaptively filter the decimated difference terms and an output of the Fourier transformation based at least in part on filter coefficients received as input to the per-carrier frequency domain equalizer filter, wherein decimation is applied to at least some of the difference terms input to the per-carrier frequency domain equalizer filter, and wherein interpolation is applied to at least some of the per-carrier frequency domain equalizer filter coefficients.

21. The multi carrier signal equalizer of claim 20, wherein a higher level of decimation is performed on some difference terms than other difference terms.

22. The multi carrier signal equalizer of claim 20, wherein no decimation is performed on some of the difference terms.

23. The multi carrier signal equalizer of claim 22, further comprising a noise measurement unit to measure noise for one or more carriers, wherein decimation or non-decimation of difference terms is determined based in part on carrier signal-to-noise ratios.

24. The multi carrier signal equalizer of claim 20, having a first stored Recursive Least Squares (RLS) data structure for non-decimated difference terms and a second stored RLS data structure for decimated difference terms, for use in training the per-carrier frequency domain equalizer filter.

25. The multi carrier signal equalizer of claim 20, further comprising a noise measurement unit to measure noise for one or more carriers, wherein a number of filter coefficients of the per-carrier frequency domain equalizer filter for at least one carrier or group of carriers is selected dynamically according to measured noise for the one or more carriers.

* * * * *

UNITED STATES PATENT AND TRADEMARK OFFICE
CERTIFICATE OF CORRECTION

PATENT NO. : 8,102,924 B2  
APPLICATION NO. : 11/014671  
DATED : January 24, 2012  
INVENTOR(S) : Fabio Pisoni Page 1 of 1

It is certified that error appears in the above-identified patent and that said Letters Patent is hereby corrected as shown below:

Col. 6, lines 51-55 should read $$-v_{i,t+1} \cdot \alpha^{i-1} + v_{i,t} = w_{t,t}$$
$$\alpha = e^{-j2\pi/N}$$
$$v_{i,T-1} = w_{i,T-1}$$

Eq. 4a

Col. 6, lines 59-61 should read $$v_i = v2w(w_i, i, N)$$
$$w_i = w2v(v_i, i, N)$$

Eq. 5

Signed and Sealed this  
Sixth Day of March, 2012

David J. Kappos  
*Director of the United States Patent and Trademark Office*